INVENTOR.
Maurice M. Rousseau
BY
Ezekiel Wolf, Wolf & Greenfield
ATTORNEYS

July 3, 1962 M. M. ROUSSEAU 3,041,903

METHOD OF MANUFACTURING (BRASSIERE) CUPS

Filed Aug. 28, 1957 5 Sheets-Sheet 2

INVENTOR.

Maurice M. Rousseau

BY

Ezekiel Wolf, Wolf & Greenfield

ATTORNEYS

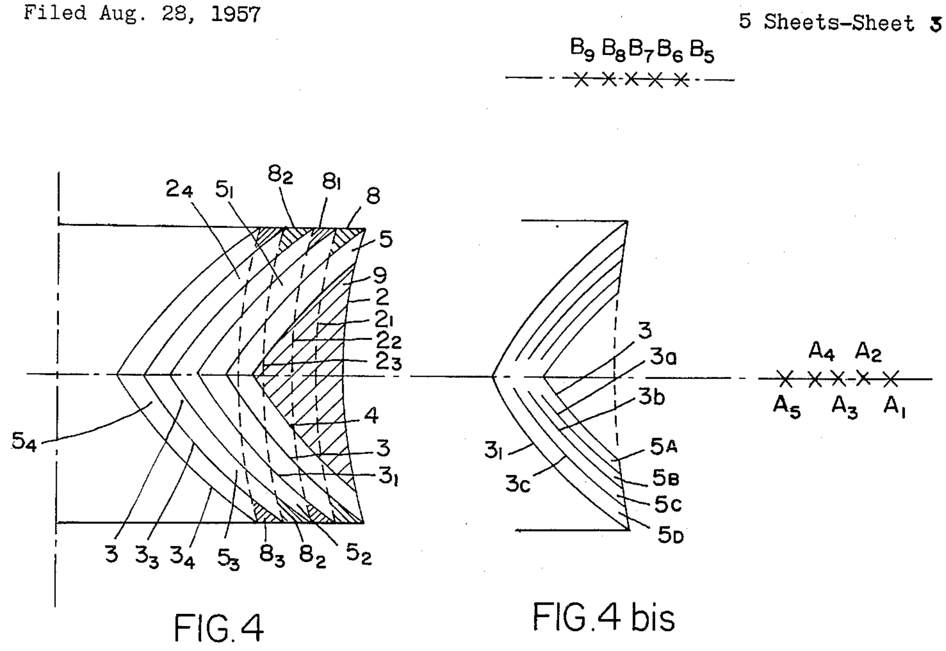
FIG. 4, FIG. 4 bis
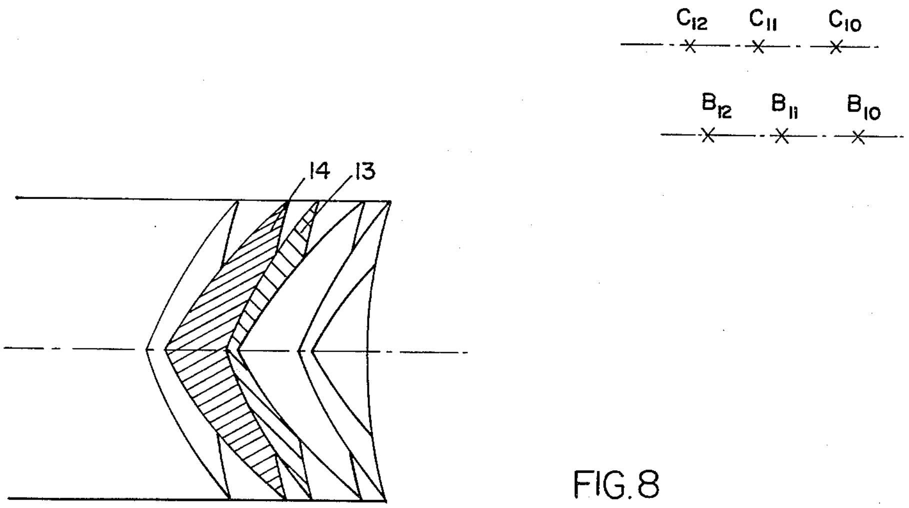
FIG. 8
INVENTOR.
Maurice M. Rousseau
BY
Ezekiel Wolf, Wolf + Greenfield
ATTORNEYS INVENTOR.
Maurice M. Rousseau
BY
Ezekiel Wolf, Wolf & Greenfield
ATTORNEYS INVENTOR.
Maurice M. Rousseau
BY
Ezekiel Wolf, Wolf & Greenfield
ATTORNEYS 3,041,903

METHOD OF MANUFACTURING (BRASSIERE) CUPS

Maurice M. Rousseau, 41 Rue de la Tranchee, Poitiers, France

Filed Aug. 28, 1957, Ser. No. 680,792
Claims priority, application France Mar. 6, 1957
6 Claims. (Cl. 82—1)

One object of the invention is to obtain solid cups by cutting out on a lathe, intended, more particularly, to be used as brassiere fittings and thus enable the total absence of breasts to be remedied.

Another object of the invention is obtained by cutting out hollow cups on a lathe which can be used as fittings, linings and reinforcements for brassieres.

Another object of the invention is obtained by cutting out hollow cups in a single piece on a lathe but composed of several easily detachable layers. These layered cups enable the user to remove one or more layers at will so that the empty space between the brassiere cup and the under-developed breast is filled in.

Another object of the invention is obtained by cutting out hollow cups on a lathe like those mentioned above, but of smaller dimensions, so as to be used like a breast nipple by a person whose bust does not fill up the point of the brassiere.

Another object of the invention is a tool equipment for obtaining the afore-mentioned cups by means of a lathe, in a simple, practical and rational manner.

The invention also applies to the characteristics hereinafter mentioned and to their various possible combinations.

A device according to the invention is shown by way of non-restrictive example in the attached drawings, in which:

FIGURE 4 is a longitudinal sectional view showing the successive rational cuts of parallel-faced cups.

FIGURE 4 bis is a longitudinal sectional view showing a cup with several layers.

Figure 5:
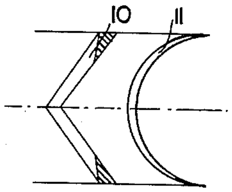

FIGURE 5 is a view showing the extreme curvature shapes that can be given to the surface of revolution.

Figure 6:
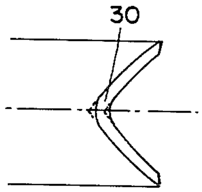

FIGURE 6 is a longitudinal sectional view showing the cutting out of a spherical cup at the summit of the false breast.

Figure 7:
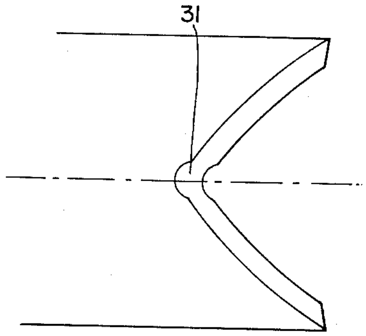

FIGURE 7 is a longitudinal sectional view showing the cutting out of a breast tip.

FIGURE 8 is a view showing the cutting out of non-parallel-faced cups.

Figure 9:
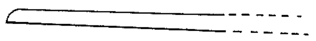
Figure 10:
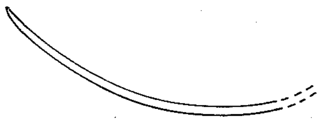

FIGURES 9 and 10 are front and top views of the tool with which cups are obtained.

Figure 11:

FIGURE 11 is a view of the end of the tool.

Figure 12:
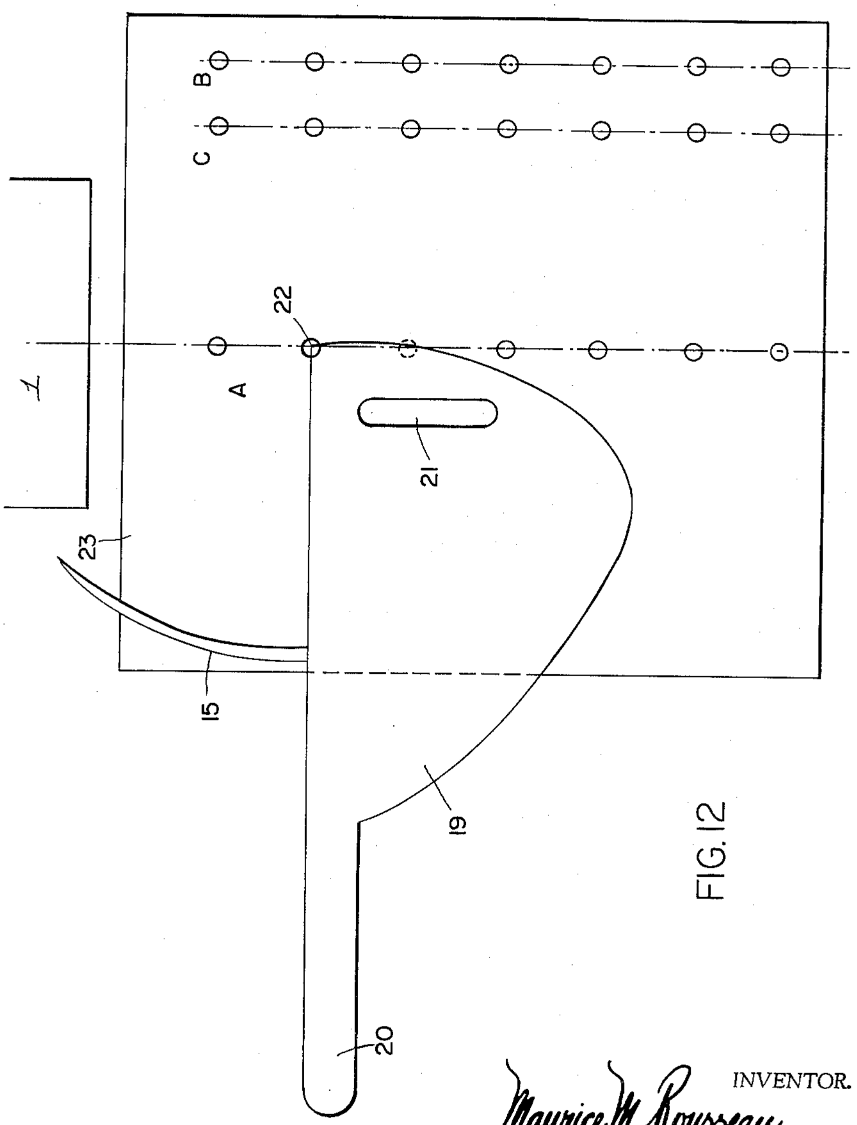

FIGURE 12 is a view of the tool set in the case where the mass of material is rotatively mobile.

Figure 13:
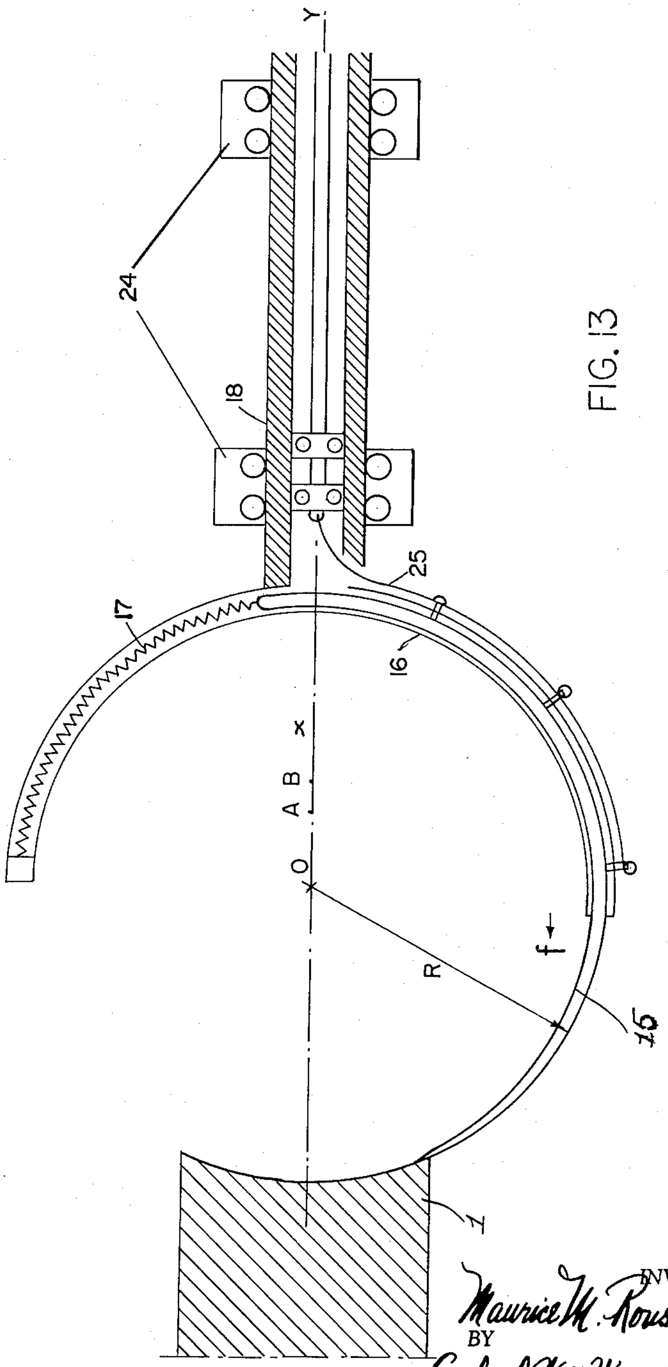

FIGURE 13 is a view of the tool set in the case where the tool is rotatively mobile.

Figure 15:
Figure 14:
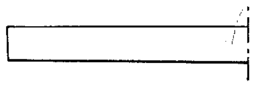

FIGURES 14 and 15 are front and top views of a tool alternative.

Figure 1:
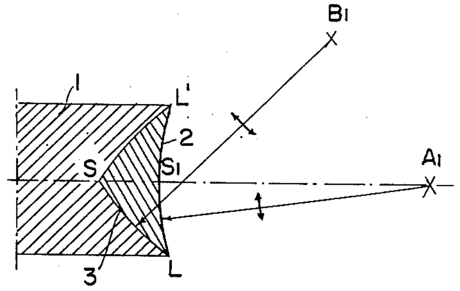
FIGURE 1 is a longitudinal sectional view of the cutting out of a solid cup.

The fitting shown in FIGURE 1 is a solid cup suitable, for example, for a person who has undergone an operation; this cup is obtained by cutting out a mass of cylindrical flexible material 1 along a first surface of revolution with a circular arc profile 2 centered at $A_1$.

Then, by cutting out, in the cylindrical mass, a second surface of revolution with a circular arc profile 3 centered at $B_1$ is obtained.

Thus, two surfaces of revolution are obtained, one concave 2, the other convex 3 confining between them the cup which forms the fitting. The surface 2 is intended to rest against the chest, the surface 3 forming the external shape of the artificial breast.

The surfaces of revolution are obtained by introducing a thin tool into the material, this tool being tapered and with a cutting edge at its end; the relative rotation of the mass and the tool in connection with each other is brought about; the point of the tool only penetrates as far as the cylinder axis at the point S along the trajectory LS. It is the rotation movement which effects the complete cutting out along SL′ symmetrical with SL in relation to the rotation axis of the cylinder 1 of flexible material.

The center $B_1$ of the surface 3 is offset in relation to the axis of the cylinder, which enables a profile of two intersecting circular arcs to be imparted to the external surface of the cup.

Figure 2:
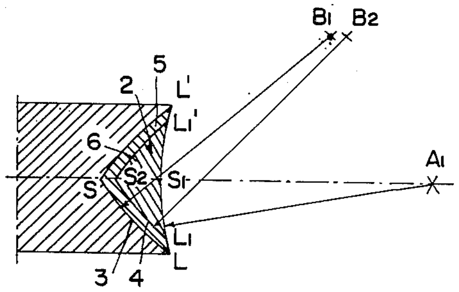
FIGURE 2 is a longitudinal view showing the cutting out of a hollow cup.

In the case of FIGURE 2, a hollow cup 5 is obtained, intended to contain an under-developed breast, this hollow cup being achieved by effecting in the cylinder:

(*a*) The cutting out of a surface of revolution 2 similar to that of FIGURE 1;

(*b*) The cutting out of a surface of revolution 4 according to the method of cutting out the surface 3 but of a smaller dimension than this surface 3;

(*c*) The cutting out of the surface of revolution 3.

In the case where a hollow cup is desired to be obtained, as above, cuttings 6 will be found to be left over. These cuttings may be advantageously used for making breast "tips" (or reduced sized cups, utilized for women who do not entirely fill out the tip of their brassiere).

Figure 3:
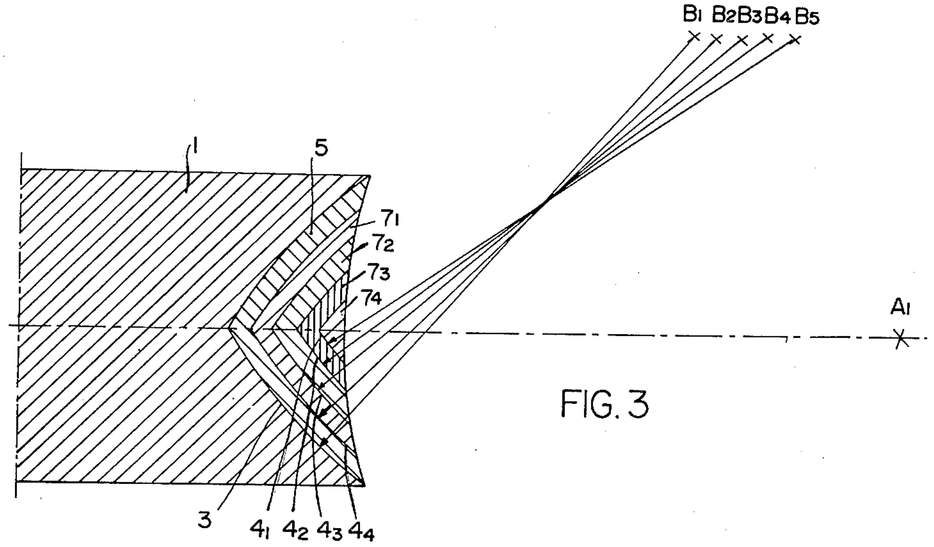
FIGURE 3 is a longitudinal sectional view showing the cutting out of cups forming breast tips from the cuttings left over from cutting out the hollow cup.

For obtaining the latter (FIGURE 3), it is only necessary to precede the center cut $B_2$ by successive cuts of the respective centers $B_5$, $B_4$, $B_3$. The cups $7_4$, $7_3$, $7_2$, $7_1$ are thus obtained.

In other words, the rational method of cutting out cups and additional breast tips is as follows:

(*a*) Plotting the center axis $A_1$;

(*b*) Plotting in their order, arcs $4_1$, $4_2$, $4_3$, $4_4$ of centers $B_5$, $B_4$, $B_3$, $B_2$ (this latter arc terminating the series of breast tips and preparing the internal face of the cup itself).

(*c*) Plotting the arc 3 of the center $B_1$ which terminates the normal cup 5.

*Parallel-Faced Cups (FIGURE 4)*

When parallel-faced cups are required, a first cup 5 is cut out, which is the most rational process, of which the cut-out external face 3 will form the cut-out internal face of the following cup $5_1$. As soon as the cup 5 is detached, a circular arc $2_1$ is plotted from $A_2$ intended to cut out the base of the cup and allowing the cutting 8 to fall. Then, from $B_6$ the external face 3 is cut out, this cut also effecting the cut of the interior face of the following cup.

This operation is continued in the same manner: centered circular arc $A_3$ then centered circular arc $B_7$, centered circular arc $A_4$ then centered circular arc $B_8$, and so on.

*Various Curvatures—FIGURE 5*

The curvature of the various surfaces of revolution is variable, everything depending on the curvature of the tool and the pivoting center of this tool.

In this manner it is possible, by means of a rectilinear tool, to obtain a tapered cup 10, the pivoting center being very distant or else, in the other extreme case, a crescent 11, the tool having a semi-circular profile and the pivoting center being at the actual border of the cylinder.

It is not indispensable to utilize the same compass opening, on the one hand for the centers A (base arc of the breast) and on the other hand for the centers B (curvature arc of the breast), FIGURE 5 being an example of this. But certain advantages are afforded by retaining the same opening, both for plotting as well as machining, seeing that in this latter case, a single tool for cutting out serves for both arcs.

The angle formed between these two arcs at their intersection has a great advantage when the cup is intended to be sewn into a brassiere. This angle gains by being somewhat acute (as in FIGURES 1 and 2) to enable the brassiere manufacturer to sew, i.e., to take the contour of the cup between two seams, around the inner cup of his brassiere.

*Non-Parallel-Faced Cup (FIGURE 8)*

There may be some advantage in the two faces of the cup not being parallel.

Certain brassiere makers prefer a cup model that is thicker in the center than at the edges (more flexible edges) 14.

Others prefer the edges to be thicker (better fit and more flexible point) 13.

One or other of these models can thus be easily obtained (or both alternately, seeing that they supplement each other) as shown in FIGURE 8, by cutting out the internal faces of the thin-edged cups 14 (hence, the external faces of the thick-edged cups 13) from the centers $B_{10}$, $B_{11}$, $B_{12}$, and the external faces of the thin-edged cups 14 (hence, the internal faces of the thick-edged cups 13) from the centers $C_{10}$, $C_{11}$, $C_{12}$.

*Multi-Layered Cup (FIGURE 4 bis)*

By stopping the knife as it goes into the foam, before the end of its trajectory, a cup is obtained that is still attached to the following one by its central part.

By successively thrusting the knife into the rotating foam, at various depths, along the cutting lines $3_A$—$3_B$—$3_C$, an artificial breast is obtained in a single piece, but composed of a varied number of cups, i.e., an artificial breast made up of several layers $5_A$, $5_B$, $5_C$, $5_D$ (FIGURE 4 bis).

*Rounded-Tip Cups and Cups Provided With a Nipple*

The flexibility of polyurethane foam has been mentioned above. It is such that in densities of 35 to 50 kgs./m.$^3$ it affords two alternatives that can be applied to all the afore-mentioned models.

*1st Alternative—Rounded-Tip Cups (FIGURE 6)*

When the shears have arrived at about ¾ths of their trajectory inside the foam, it is possible, owing to this flexibility to impart to the cutting end of the knife, a recoil movement concomitant with the terminating by the knife of one-fourth of its trajectory.

This causes the knife to rub on the cup during the finishing stage and has the effect of giving the cup a more rounded tip (as a matter of fact, certain brassieres have this profile) (FIGURE 6).

*2nd Alternative—Cups Provided With a Nipple*

When the shears have arrived at about 9⁄10ths of their normal trajectory inside the foam, it is possible, owing to the flexibility of the latter, to impart to the cutting end of the knife, a forward movement concomitant with the terminating of 1⁄10th of this trajectory.

This causes the knife to rub on the block of raw material and give to the artificial breast, during the finishing stage, a tip which perfectly imitates the natural nipple of the breast.

All shapes of tips can be secured by synchronizing at will the forward movement of the knife point with the forward movement of the carrier system.

For a knife about 8 mm. wide, the flexibility of the polyurethane foam enables forward movements of 8 to 10 mm. to be made, which is more than sufficient for obtaining a breast tip that perfectly imitates the natural nipple (FIGURE 7).

*Subsequent Cuts*

The machined artificial breasts and cups, when seen from the front, have a circular aspect and are often used in this state.

Subsequent cuts will impart all possible shapes to them, and more particularly:

(1) By cutting them out to the exact shape of a brassiere cup of a given make;

(2) By cutting out their upper one-fourth for adapting them to a brassiere known as a "basket" or "balloon."

(3) By cutting them out in the middle to obtain what is called a "semibreast," intended to be placed in the bottom of any kind of brassiere cup and thus increasing the apparent size of the bust to the same extent.

In these three cut-out shapes, it would be advisable to recut the edges of the cups so that the latter are very tapered and that the stiffening that they form fits naturally and snugly on the user's breast.

*Tool Equipment*

The knife or tool 15 (FIGURES 9, 10, 11). Chilled forged steel blade, of variable width and reduced thickness, curved exactly according to the radius R of the cup that is required.

This blade is sharpened at the end only.

Two alternatives of cutting edge are provided for:

(1) For machining hard materials: wood, polyethylene, polystyrene, etc., a strong blade with a wide cutting edge, perpendicular to the cutting line, the cutting edge should replace the shears which sink in (FIGURES 14 and 15).

(2) For machining flexible materials, such as polyurethane foam: a thin blade with a tapered cutting edge, parallel to the cutting line, the flexibility of the material enabling the shears to sink into the circular slot that its point makes in the material (FIGURES 9 and 10).

*Two Cutting-Out Methods*

For greater clearness, it is sufficient to describe these two methods in their most rudimentary form, it being obvious that all automatic or semi-automatic fittings based on the same principles and utilizing the same methods, are possible.

*(a) First Method (FIGURE 13)*

The tool head turns and the work piece is stationary.

The blade 15 is curved along an arc of radius R and extends over a little less than a semi-circumference of center *o*. This blade penetrates the work-piece 1 advancing in the direction of arrow *f*.

It slides, with no play, in a slot 16 of the like semi-circular shape and is retained at its non-cutting end by a spring 17.

This semi-circular slot is welded at its middle to a hollow shaft 18 and this latter is fixed on a holder carriage 24. This holder carriage is articulated so that the center *o* of the knife may successively take the positions of the various centers of cutting A and B. (FIGURES 1, 2, 3, 4, 4 bis.)

The sliding blade may obviously be drawn in or out of its slot at will by means of a simple handle and cable 25 inside the shaft.

It may easily be understood that the penetration of the cutting edge of the blade 15 in the work piece 1 results in cutting the material of the work-piece along an arc R of center *o*. Because of the rotary motion about the axis *x*, *y* of the holder shaft 18, the blade cuts the work-piece along a surface of revolution.

The tool may be adjusted thereafter to cut caps of various forms such as those which have been described above.

(*b*) *Second Cutting-Out Method* (*FIGURE 12*)

The raw material, and not the tool-holder, turns. The blade is welded to a movable tool-holder plate 19 which the operator holds by two handles 20 and 21.

A steel point 22, perpendicular to the tool-holder plane, is welded on the tool-holder and acts as pivoting axis for the tool-holder.

A horizontal platform holder carriage 23 moves parallel to the axis of the cylindrical mass 1 and has rows of holes A—B—C on the platform for receiving the above-mentioned steel point.

These holes will be previously drilled in the cutting-out center positions of the various surfaces.

By a revolving movement of the tool-holder around this spindle 22, the blade will be thrust into the rotating foam.

It goes without saying that the invention is not restricted to the forms of embodiment precisely described and shown, and from which other alternatives could be provided without going outside the scope of the invention for that purpose.

What I claim is:

1. A process for the manufacture of a brassiere padding from a soft deformable mass of material comprising, rotating said mass on an axis, penetrating said mass with a curved cutting tool to form a first concave surface of revolution, then penetrating said mass again with said tool to generate a second concave surface of revolution continuous with said first to form in part a tapered peripheral edge of said padding, then moving the tool in said axial direction and penetrating said mass a third time and rotating said mass to generate a convex surface of revolution extending from said edge to an apex coincident with said axis and adapted to form the outer surface of said padding.

2. A process for the manufacture of a brassiere padding from a soft deformable mass of material comprising, rotating said mass on an axis, penetrating said mass with a curved cutting tool to form a first concave surface of revolution, then penetrating said mass again with said tool to generate a second concave surface of revolution continuous with said first to form in part a tapered peripheral edge of said padding, then penetrating said mass a third time with said tool having the axis of its curved surface displaced from said axis and rotating said mass to generate a convex surface of revolution extending from said edge to an apex coincident with said axis and adapted to form the outer surface of said padding.

3. A process for the manufacture of a brassiere padding from a soft deformable mass of material comprising penetrating said mass with a curved cutting tool having a curved cutting edge with a radial center, rotating said tool and mass relative to one another along an axis passing through said mass and said center whereby a concave surface of revolution is formed, then moving said tool and mass to a second position with said tool penetrating said mass adjacent said concave surface and rotating said mass and tool relative to one another to form a second concave section continuous with said first concave section thereby in part forming a tapered edge of said padding, then penetrating said mass a third time and rotating said mass and tool relative to one another to generate a convex surface of revolution extending from said edge to an apex coincident with said axis and adapted to form the outer surface of said padding.

4. A process for the manufacture of a brassiere padding from a soft deformable mass of material comprising penetrating said mass with a curved cutting tool having a curved cutting edge with a radial center, rotating said tool and mass relative to one another along an axis passing through said mass and said center whereby a concave surface of revolution is formed, then moving said tool and mass to a second position with said tool penetrating said mass adjacent said concave surface and rotating said mass and tool relative to one another to form a second concave section continuous with said first concave section thereby in part forming a tapered edge of said padding, then penetrating said mass and rotating said mass and tool relative to one another a plurality of times, with said penetrations in each of said plurality of times spaced successively inwardly into said mass and with the tip of said tool spaced from said axis whereby a plurality of parallel annular cuts are formed in said mass, and then penetrating said mass a final time and rotating said mass and tool relative to one another to generate a convex surface of revolution extending from said edge to an apex coincident with said axis and adapted to form the outer surface of said padding.

5. A process as set forth in claim 3 wherein said rotation of said tool after said third penetration is terminated with a movement of the tool in a direction parallel to said axis and toward said mass.

6. A process as set forth in claim 3 wherein said rotation of said tool after said third penetration is terminated with a movement of the tool in a direction parallel to said axis and away from said mass thereby rounding said convex surface at the apex thereof.

References Cited in the file of this patent

UNITED STATES PATENTS

| | | |
|---|---|---|
| 259,196 | Neff | June 6, 1882 |
| 278,828 | Smith | June 5, 1883 |
| 389,417 | Spofford | Sept. 11, 1888 |
| 420,363 | Shotwell | Jan. 28, 1890 |
| 626,634 | Rylands | June 6, 1899 |
| 1,519,344 | Allemeier | Dec. 16, 1924 |
| 2,044,497 | Schiltz | June 16, 1936 |
| 2,237,744 | Mullen | Apr. 8, 1941 |
| 2,292,720 | Spence | Aug. 11, 1942 |
| 2,524,028 | Bordner | Oct. 3, 1950 |
| 2,636,182 | Freedman | Apr. 28, 1953 |

FOREIGN PATENTS

| | | |
|---|---|---|
| 7,452 | Great Britain | June 18, 1885 |